(No Model.) 2 Sheets—Sheet 1.
G. F. FLYNN.
DOUBLE HARROW.
No. 275,374. Patented Apr. 10, 1883.
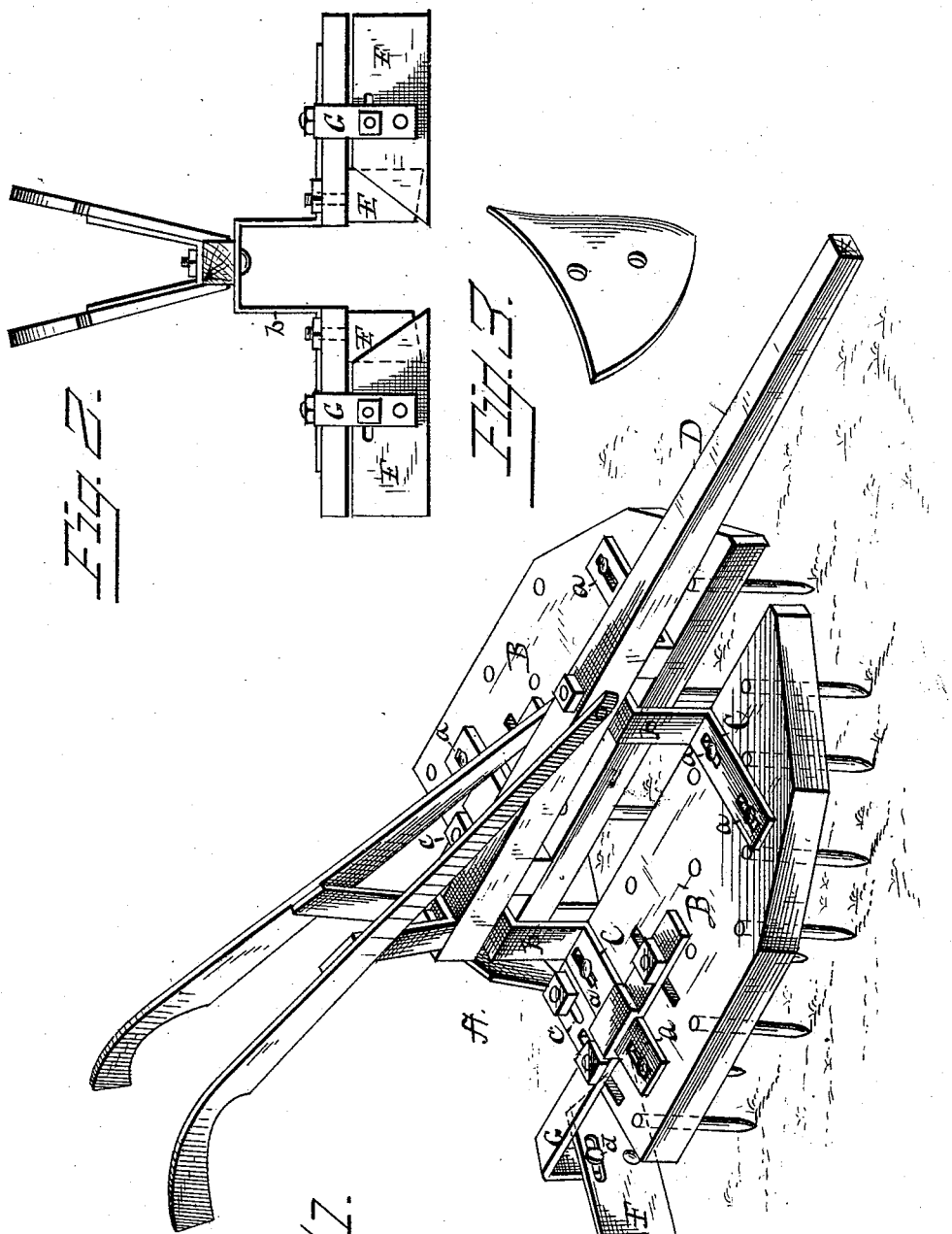
Witnesses:
Franck L. Ourand
J. Heylmun
Inventor:
G. F. Flynn
by Heylmun & Kane
Attorneys.

(No Model.)
G. F. FLYNN.
DOUBLE HARROW.
No. 275,374. Patented Apr. 10, 1883.
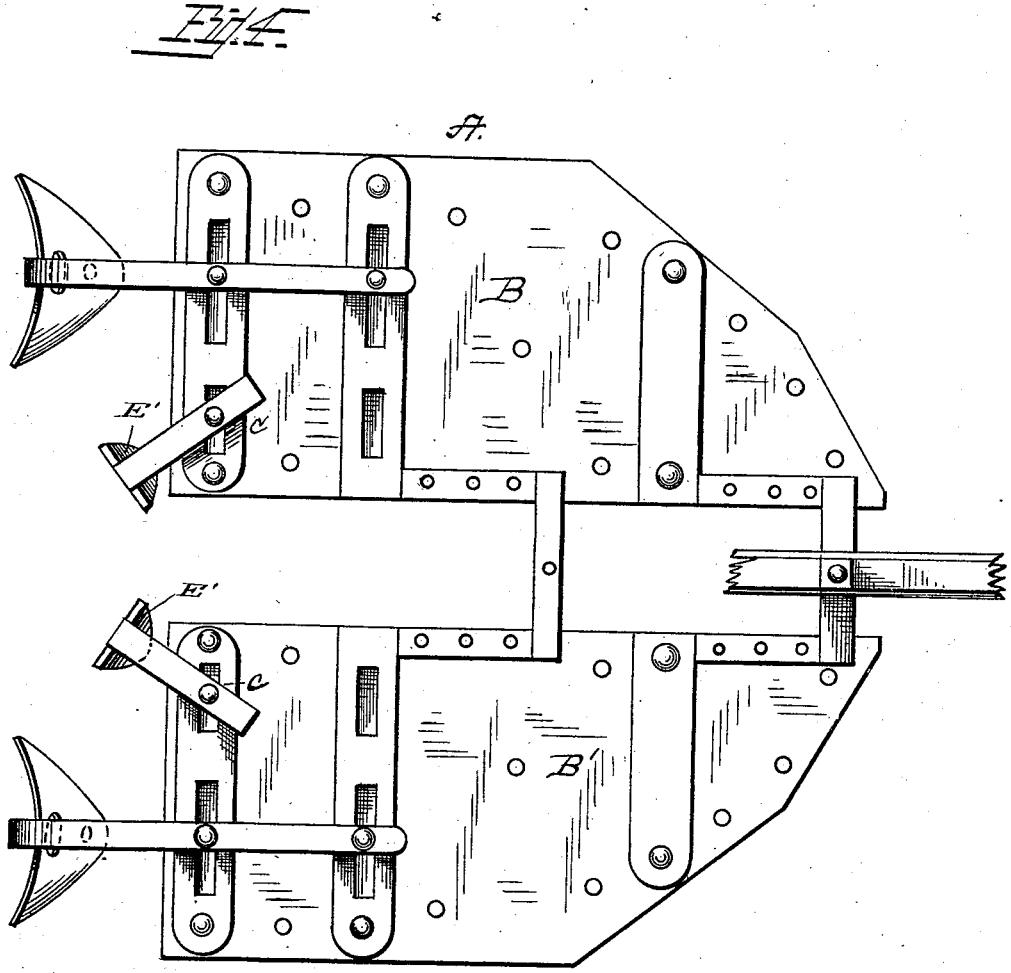
WITNESSES
INVENTOR

UNITED STATES PATENT OFFICE.

GEORGE F. FLYNN, OF PANTEGO, NORTH CAROLINA.

DOUBLE HARROW.

SPECIFICATION forming part of Letters Patent No. 275,374, dated April 10, 1883.

Application filed December 15, 1882. (No model.)

*To all whom it may concern:*

Be it known that I, GEORGE F. FLYNN, a citizen of the United States of America, residing at Pantego, in the county of Beaufort and State of North Carolina, have invented certain new and useful Improvements in Double Harrows; and I do hereby declare the following to be a full, clear, and exact description of the invention, such as will enable others skilled in the art to which it appertains to make and use the same.

This invention relates to improvements in combined double harrows and cultivators; and its object is to provide a substantial implement of the kind which may be adjusted to cultivate rows of different widths, and is provided with scrapers and dirters to throw the soil toward the plants, and also adapted to remove the weeds from the plants.

My improvement consists in the novel organization and combination of parts, as will be hereinafter more fully set forth and specifically claimed.

In the annexed drawings, making a part of this specification, Figure 1 is a perspective view of my improved harrow. Fig. 2 is an end view of the same. Fig. 3 shows a modification of the scraper fixed to the rear of the harrow; and Fig. 4 is a plan view, showing modifications of the improvements.

The letter A represents the harrow, composed of the side plates or pieces, B and B′, having parallel sides with rear end cut square across, and front portion tapering from a point on the outside across the width to the inner side, substantially as seen in Fig. 1 of the drawings. These side plates are perforated at proper distances to receive the harrow-teeth.

The letter C represents metallic bars or straps having slotted bolt-holes $a$ to receive bolts, and formed with the central elevation or arch, $b$, also having central bolt-holes in the cross-pieces of the elevations. These cross-bars are secured to the harrow by means of the bolts passed through the slots and harrow, and provided with screw nuts or keys on the under side. The arches or elevations of these bars may be omitted, and the parts formed substantially as seen in Fig. 4 of the drawings.

The letter D represents the draw-beam, resting on and secured by bolts and nuts to the cross-plates of the harrow, and secured by the rear bolt to the beam are the braces of the handles of the harrow, which extend forward a suitable distance, and are fastened by any proper means to the beam.

At the rear and inner side of each harrow is formed a slot, $c$, in which is inserted the shank of the small scrapers or stirrers E, and secured therein by a screw nut or key. These scrapers act as stirrers or beaters of the soil in advance of the larger ones in the rear. When the scrapers E′ in Fig. 4 are adjusted in the position indicated they can be used for removing weeds and the like from the plants.

The letter F represents adjustable scrapers pivotally attached to the bars G, and provided with a transverse slot, $d$, through which a screw-bolt is passed, and by means of which the dip of the scraper is adjusted. The bars G are secured to the harrow by screw bolts and nuts, and are adjustable outward and inward in the slots. It is intended that the scrapers attached to the bars G shall be interchangeable—that is, they may be changed from larger to smaller, or replaced by the shovel style, as shown in Fig. 4 of the drawings.

It will be observed that by means of the slots in the cross-bars connecting the harrows they may be adjusted to different widths, or that when the harrow is used to straddle the plants it may be adjusted to throw the dirt against them, to suit the occasion. By making the harrow-plates solid the simplicity of structure is assured, as well as the durability and strength.

What I claim as my invention, and desire to secure by Letters Patent, is—

A double harrow composed essentially of the side pieces with the teeth, and secured together by transverse metal straps having slotted bolt-holes, and central arch and scrapers secured in transverse slots at the inner rear corners of the harrow, in combination with adjustable scrapers pivotally and adjustably secured to the rear of the harrows by means of bars bolted to the side plates of the harrow, substantially as described.

In testimony whereof I affix my signature in presence of two witnesses.

GEORGE F. FLYNN.

Witnesses:
D. W. JOHNSON,
W. J. WINGATE.